April 23, 1935.   O. F. GRAEBNER   1,998,895
VEHICLE PILLAR
Filed July 22, 1932
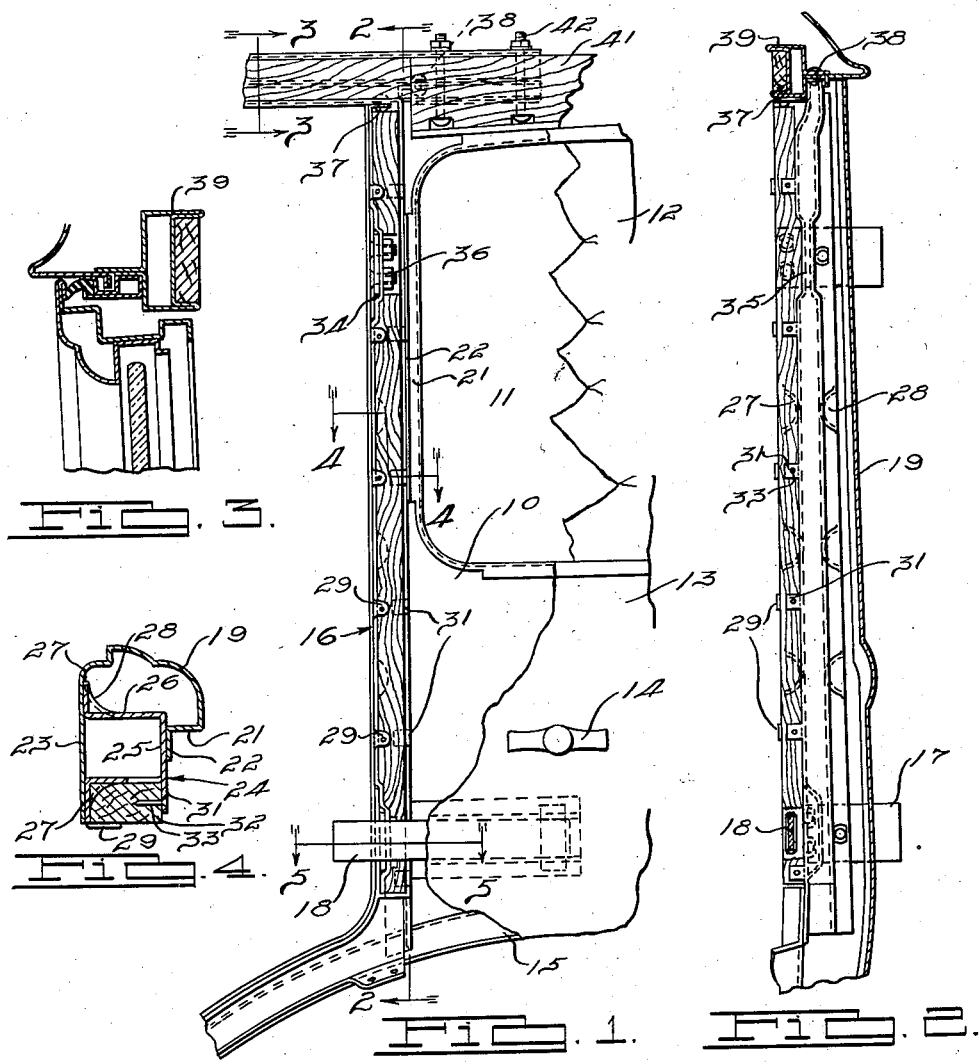
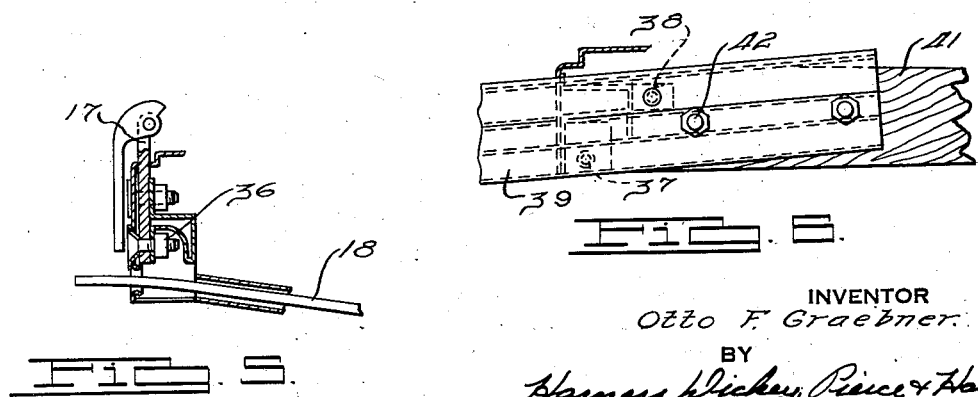
INVENTOR
Otto F. Graebner.
BY
ATTORNEYS.

Patented Apr. 23, 1935

1,998,895

UNITED STATES PATENT OFFICE 1,998,895

VEHICLE PILLAR

Otto F. Graebner, Detroit, Mich., assignor to The Murray Corporation of America, a corporation of Delaware Application July 22, 1932, Serial No. 624,031

8 Claims. (Cl. 296—28)

My invention relates to pillars for vehicle bodies and particularly to a pillar formed by a pillar member and facing element which is stamped from the body paneling.

It has been the practice heretofore to preform a pillar for a vehicle body from sheet material and so form the body paneling as to cover the outer portion of the pillar to constitute a finish therefor. The pillar construction is materially simplified when the paneling itself is extended to form the door jamb of the pillar and to reinforce a pillar member constructed in accordance with my present invention.

The main objects of my invention are; to construct the facing element for a pillar of a vehicle body by extending the paneling at the door opening; to provide a pillar member which is assembled in predetermined relation to the facing element; to provide struck out portions on the pillar member by which a tacking strip is secured thereto; and in general to provide a pillar which is simple in assembly, economical in manufacture and sturdy of construction.

Other objects and features of novelty of my invention will be either specifically pointed out or will become apparent when referring, for a better understanding of my invention, to the following description in conjunction with the accompanying drawing, wherein:

Figure 1 is a broken view, in elevation, of a pillar embodying features of my invention, Fig. 2 is a sectional view of the structure illustrated in Fig. 1, taken on the line 2—2 thereof, Fig. 3 is a sectional view of the structure illustrated in Fig. 1, taken on the line 3—3 thereof, Fig. 4 is a sectional view of the structure illustrated in Fig. 1, taken on the line 4—4 thereof, Fig. 5 is a sectional view of the structure illustrated in Fig. 1, taken on the line 5—5 thereof, and Fig. 6 is a top plan view of the structure illustrated in Fig. 1.

Referring to Fig. 1, I have illustrated a side panel 10 for a vehicle body having a window opening 11, closed by a window glass 12 which may be lowered between an inner panel 13 and the panel 10 in a conventional manner, through the adjustment of an operating handle 14. A wheel housing panel 15 extends along the bottom of the panel 10 to which a pillar 16 is attached to form one side of the rear door opening. Hinge elements 17 are secured to the pillar to support a door for swinging movement, the limit of movement of which is controlled by a check element 18 of a well known type.

The panel 10 extends inwardly, at 19, to form the window opening 11 and is extended at 21 in the plane of the window 12 and further at 22, inwardly of the body, to form the side and bottom of a glass run channel for the window. Along the edge of the door opening the panel 10 extends inwardly, at 23 parallel to the extension 22 to form the door jamb. A pillar member 24 is disposed between the extensions 22 and 23, as illustrated more clearly in Fig. 4, constituting a unit pillar with the extensions 22 and 23, which is of considerable strength in view of the rigid box section structure formed thereby when welded or otherwise secured together.

The pillar member 24 is of channel section having a bottom web 25 and side webs 26, which are laterally projected to form flanges 27 to be secured to the extension 23 of the panel 10, the extension 22 being secured to the web 25. Along the corners formed by the webs 26 and the flanges 27, spaced pressed out portions 28 are provided for strengthening the member 24. Tongues 29 are provided in extension of the flange 27 disposed inwardly of the vehicle body and tongues 31 are struck from the web 26 which are likewise disposed inwardly of the body. A tacking strip 32 is disposed between the flange 27 and the tongues 31 after which the tongues 29 are bent over the tacking strip, as illustrated in Fig. 4, while nails or other securing means 33 are driven through apertures in the tongue 31 into the tacking strip.

At the upper hinge support, the flanges 27 and the webs 26 are bent inwardly, at 34, from the extension 23 of the panel, as illustrated in Fig. 1, for receiving the hinge element 17, and the web portions 26 are drawn closer together, at 35, as illustrated in Fig. 2, to provide clearance for nuts 36 which are secured to the flanges 27. In a similar manner, to form the lower hinge support, the outer flange 27 and web portion 26 are offset inwardly from the extension 23, as illustrated in Figs. 1 and 5. The web 26 is reversely bent, as illustrated in Fig. 5, to form a pocket for receiving a nut 36 and to provide clearance for the door check element 18. The pillar member 24 has the flanges 27 thereof extending inwardly of the body, at 37, and the web portion 25 extended in the same direction, at 28, as illustrated in Figs. 1 and 2, for engagement with a metal, rolled top rail 39. The rolled metal rail is secured to the wood rail 41 by bolts 42, forming a composite rail for the body.

The pillar thus constructed is novel in that the panel of the vehicle body is preformed and extended inwardly of the vehicle to form a door jamb to abut against a pillar member positioned between the extensions at the window opening of the panel and the door jamb to strengthen the panel and to form a finished pillar. A tacking strip is secured to the reinforcing member by tongues struck from the pillar member which are folded thereover or secured by nails driven through the tongues into the tacking strip.

While I have described and illustrated but a single embodiment of my invention it will be apparent to those skilled in the art that various changes, omissions, additions and substitutions may be made therein without departing from the spirit and scope of my invention as set forth in the accompanying claims.

I claim as my invention:

1. A pillar for a vehicle body formed by extensions of the body panel at the door and window openings, a pillar member of channel section having the sides flanged outwardly, and secured to said door extension by said flanges, and a tacking strip secured to the inner edge of said member.

2. A pillar for a vehicle body including, in combination, an extension of the panel of the body at the door opening to form the door jamb, an extension at the window opening of the body, a pillar member of channel section having the sides flanged outwardly disposed between the extensions at the door and window openings with the flanges engaging the door jamb portion and the web engaging the extension at the window opening.

3. A pillar for a vehicle body including, in combination, an extension of the panel of the body at the door opening to form the door jamb, an extension at the window opening of the body, a pillar member of channel section engaged by the extensions at the door and window openings and secured to the latter by the web of said channel forming a unit construction, and a tacking strip secured to said pillar element.

4. A pillar for a vehicle body including, in combination, an extension on the body panel forming the door jamb, a pillar member therefor having tongues extending therefrom toward the inside of the body, means for securing said member to said extension, and a tacking strip secured to said member by said tongues.

5. A pillar for a vehicle body including in combination, an extension on the body panel forming the door jamb, a pillar member of channel section having the sides outwardly flanged and secured to said extension.

6. A pillar for a vehicle body including in combination, an extension on the body panel forming the door jamb, a pillar member of channel section having the sides outwardly flanged and secured to said extension, and tongues extending inwardly of the body from said member for receiving a tacking strip.

7. A pillar for a vehicle body including in combination, an extension on the body panel forming the door jamb, a pillar member of channel section having the sides outwardly flanged and secured to said extension, tongues extending inwardly of the body from said member and a tacking strip nested between said tongues and secured thereby to said member.

8. A pillar for a vehicle body including in combination, an extension on the body panel forming the door jamb, a pillar member of channel section having the sides outwardly flanged and secured to said extension, tongues extending from one of said flanges and from the channel section, and a tacking strip nested between said flange and tongues and secured by said tongues to said member.

OTTO F. GRAEBNER.